United States Patent
Bokern et al.

(10) Patent No.: US 10,563,004 B2
(45) Date of Patent: Feb. 18, 2020

(54) MEMORY FOAM BASED ON THERMOPLASTIC POLYURETHANE

(71) Applicant: BASF SE, Ludwigshafen (DE)

(72) Inventors: Stefan Bokern, Bremen (DE); Frank Prissok, Lemfoerde (DE); Sebastian Hartwig, Muenster (DE); Elmar Poeselt, Hamburg (DE); Julia Goeschel, Bremen (DE); Uwe Keppeler, Hochdorf-Assenheim (DE)

(73) Assignee: BASF SE, Ludwigshafen (DE)

( * ) Notice: Subject to any disclaimer, the term of this patent is extended or adjusted under 35 U.S.C. 154(b) by 32 days.

(21) Appl. No.: 15/561,747

(22) PCT Filed: Mar. 23, 2016

(86) PCT No.: PCT/EP2016/056321
§ 371 (c)(1),
(2) Date: Sep. 26, 2017

(87) PCT Pub. No.: WO2016/156133
PCT Pub. Date: Oct. 6, 2016

(65) Prior Publication Data
US 2018/0086871 A1    Mar. 29, 2018

(30) Foreign Application Priority Data

Mar. 27, 2015 (EP) ..................... 15161351

(51) Int. Cl.
| | | |
|---|---|---|
| *C08G 18/32* | (2006.01) | |
| *C08G 18/48* | (2006.01) | |
| *C08J 9/228* | (2006.01) | |

(52) U.S. Cl.
CPC ..... *C08G 18/3215* (2013.01); *C08G 18/4879* (2013.01); *C08J 9/228* (2013.01); *C08G 2280/00* (2013.01)

(58) Field of Classification Search
CPC ............ C08G 18/3215; C08G 18/4879; C08G 2280/00; C08J 9/228
See application file for complete search history.

(56) References Cited

U.S. PATENT DOCUMENTS

| | | | |
|---|---|---|---|
| 5,135,786 A | 8/1992 | Hayashi et al. | |
| 7,524,914 B2 | 4/2009 | Mather et al. | |
| 2005/0245719 A1 | 11/2005 | Mather et al. | |
| 2009/0253842 A1 | 10/2009 | Mather et al. | |
| 2010/0144962 A1* | 6/2010 | Jana .................. | C08K 9/08 524/590 |
| 2011/0217547 A1* | 9/2011 | Mather ............... | B29C 61/003 428/339 |
| 2012/0000251 A1* | 1/2012 | Hu ...................... | C08G 18/10 66/171 |
| 2012/0279101 A1 | 11/2012 | Pretsch et al. | |

FOREIGN PATENT DOCUMENTS

| | | |
|---|---|---|
| EP | 0 361 418 A2 | 4/1990 |
| EP | 1 979 401 B1 | 9/2010 |
| JP | 2005-102953 | 4/2005 |
| JP | 2005-102953 A | 4/2005 |
| WO | 2011/060970 A1 | 5/2011 |

OTHER PUBLICATIONS

International Preliminary Report on Patentability dated Sep. 28, 2017 in PCT/EP2016/056321 (submitting English language translation only).
Kunststoff-Handbuch, vol. VII, edited by Dr. Richard Vieweg and Dr. Aug. Hochtlen, "Polyurethane", Carl Hanser Verlag, Munich, 1966, 13 pages.
Kunststoff-Handbuch, vol. 7, Herausgegeber von Dr. Günter Oertel, "Polyurethane", Carl Hanser Verlag, 3rd edition 1993, section 3A, 21 pages.
U.S. Appl. No. 14/908,079, filed Jan. 27, 2016, 2016/0159999, Prissok, Frank, et al.
U.S. Appl. No. 14/890,847, filed Nov. 12, 2015, US2016/0090436A1, Prissok, Frank, et al.
U.S. Appl. No. 14/898,304, filed Dec. 14, 2015, US2016/0135253A1, Tomovic, Zeljko, et al.
U.S. Appl. No. 15/034,116, filed May 3, 2016, Prissok, Frank, et al.
U.S. Appl. No. 15/307,134, filed Oct. 27, 2016, Prissok, Frank, et al.
U.S. Appl. No. 14/899,923, filed Dec. 18, 2015, 2016/0137814, Otero Martinez, Iran, et al.
U.S. Appl. No. 15/028,357, filed Apr. 8, 2016, 2016/244584, Keppeler, Uwe.
U.S. Appl. No. 14/897,746, filed Dec. 11, 2015, 2016/121524, Daeschlein, Christian, et al.
U.S. Appl. No. 15/129,540, filed Sep. 27, 2016, Bokern, Stefan.
U.S. Appl. No. 15/128,332, filed Sep. 22, 2016, Poeselt, Elmar, et al.

(Continued)

*Primary Examiner* — John M Cooney
(74) *Attorney, Agent, or Firm* — Oblon, McClelland, Maier & Neustadt, L.L.P.

(57) ABSTRACT

The present invention relates to a process for producing a molding (FK), comprising the production of a thermoplastic polyurethane, comprising the reaction of at least one polyisocyanate composition, at least one chain extender, and at least one polyol composition, the production of a molding (FK*) from the thermoplastic polyurethane, the heating of the molding (FK*) to a temperature below the temperature at which the molding (FK*) is permanently deformable, and above the switching temperature of the thermoplastic polyurethane, the compressing of the heated molding (FK*) to give a molding (FK), and the cooling of the molding (FK) to a temperature below the switching temperature of the thermoplastic polyurethane, and also to the moldings obtainable or obtained by such a process.

12 Claims, No Drawings

(56) References Cited

OTHER PUBLICATIONS

U.S. Appl. No. 15/100,091, filed May 27, 2016, 2017/267806, Goeschel, Julia, et al.
U.S. Appl. No. 15/506,916, filed Feb. 27, 2017, 2017/260320, Bokern, Stefan, et al.
U.S. Appl. No. 15/557,671, filed Sep. 12, 2017, Prissok, Frank, et al.
International Search Report dated Apr. 25, 2016, in PCT/EP2016/056321 filed Mar. 23, 2016.

* cited by examiner

MEMORY FOAM BASED ON THERMOPLASTIC POLYURETHANE

The present invention relates to a process for producing a molding (FK), comprising the production of a thermoplastic polyurethane, comprising the reaction of at least one polyisocyanate composition, at least one chain extender, and at least one polyol composition, the production of a molding (FK*) from the thermoplastic polyurethane, the heating of the molding (FK*) to a temperature below the temperature at which the molding (FK*) is permanently deformable, and above the switching temperature of the thermoplastic polyurethane, the compressing of the heated molding (FK*) to give a molding (FK), and the cooling of the molding (FK) to a temperature below the switching temperature of the thermoplastic polyurethane, and also to the moldings obtainable or obtained by such a process. Switching temperature refers to the temperature at which there is a phase transition below the melting temperature of the hard phase. This may be a glass transition or a melting transition of semicrystalline or fully crystalline structures. The present invention further relates to the use of a thermoplastic polyurethane for producing a molding having shape memory effect in a temperature range from 20° C. to 120° C.

Thermoplastic polyurethanes for various applications are known fundamentally from the prior art. By varying the ingredients it is possible to obtain different profiles of properties.

Also known per se are thermoplastic polyurethanes which display a shape memory effect. The shape memory effect is usually based on soft phase crystallization of polyester polyols. A disadvantage of the polyurethanes based on polyester polyols is inadequate stability toward hydrolysis and aggressive chemicals such as strong acids and bases, which severely restricts the usefulness, for exterior applications for example. Alternatively, the shape memory effect may also be generated through the use of blends. Blends, however, are costly and inconvenient to produce and are not phase-stable. Another approach to achieving a shape memory effect is to use nanostructured polyols, which, however, are likewise costly and inconvenient to synthesize.

JP 2005102953 describes a nonthermoplastic shape memory resin for the adaptation of teeth that allows subsequent corrections. The resin is alternatively polyurethane-, polyurethane-urea-, polynorbornene-, t-polyisoprene- or styrene-butadiene-based and has a glass transition temperature of between 40 and 100° C. (preferably 60 to 80° C.).

In addition, WO 2011/060970, and the parallel US 20120279101 A1, disclose a shape memory TPU based on polyester polyols. These polyols are not stable toward hydrolysis. Bisphenol A-based compounds are used as chain extenders for the hard phase. As chain extenders in the hard phase, they display disadvantages in mechanical properties.

U.S. Pat. No. 7,524,914 B2 describes the production of a shape memory TPU through the use of a dihydroxyl-terminated polyhedral oligosilsesquioxane. This compound is costly and inconvenient to produce.

On the basis of the prior art, one object of the present invention was to provide a thermoplastic polyurethane having a shape memory effect that is stable toward chemicals such as dilute hydrochloric acid. A further object of the present invention was to provide a thermoplastic polyurethane having a shape memory effect that is stable toward chemicals such as dilute hydrochloric acid and that is simple and cost-effective to produce. A further object of the present invention was to provide materials which can be used as insulating material and can easily be adapted to an existing cavity.

In accordance with the invention this object is achieved by means of a process for producing a molding (FK), comprising the following steps:
(a) preparing a thermoplastic polyurethane, comprising the reaction of
(i) at least one polyisocyanate composition;
(ii) at least one chain extender; and
(iii) at least one polyol composition,
the polyol composition comprising at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated;
(b) producing a molding (FK*) from the thermoplastic polyurethane,
(c) heating the molding (FK*) to a temperature below the temperature at which the molding (FK*) is permanently deformable, and above the switching temperature of the thermoplastic polyurethane,
(d) compressing the heated molding (FK*) to give a molding (FK),
(e) cooling the molding (FK) to a temperature below the switching temperature of the thermoplastic polyurethane.

Surprisingly it has been found that through the process of the invention and the use of a thermoplastic polyurethane based on bisphenol-based monomers in conjunction with a polyol, chain extender and diisocyanate, moldings are obtained which exhibit a shape memory effect.

In accordance with the invention, the thermoplastic polyurethane may in particular be a foam or be in the form of a foam, and for example a bead foam or an extruded foam. According to a further embodiment, accordingly, the present invention relates to a process as described above wherein the thermoplastic polyurethane is a bead foam or an extruded foam. The present invention relates accordingly to a process as described above wherein the thermoplastic polyurethane is in the form of a bead foam or an extruded foam.

In accordance with the process of the invention, the molding (FK*) produced from the thermoplastic polyurethane is first compressed at a temperature above the switching temperature, and in the compressed state is cooled to a temperature below the switching temperature. This gives a molding (FK), which is compressed relative to the molding (FK*) and which is stable in this compressed state. The diminished extent of the material is therefore "frozen in". By reheating of the molding (FK) to a temperature above the switching temperature, the TPU or the molding deforms very quickly to its original size, i.e., back to the size of the uncompressed molding (FK*). This procedure may entail a residual compression of up to 20%. Foams in particular are suitable in accordance with the invention, since the expansion of the molding on heating of the molding (FK) to a temperature above the switching temperature is rapid and simple.

The process of the invention comprises steps (a) to (e). First of all, in step (a), a thermoplastic polyurethane is prepared by reaction of at least one polyisocyanate composition, at least one chain extender and at least one polyol composition. The polyol composition here, in accordance with the invention, comprises at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated.

According to one preferred embodiment, the process in step (a) is carried out at temperatures higher than room temperature, more preferably in the range between 50° C. and 200° C., very preferably in the range from 65° C. and 150° C., more particularly in the range from 75° C. and 120° C.

In accordance with the invention, the heating may take place in any suitable way known to the skilled person. Preferably by electrical heating, heating via heated oil or water, induction fields, hot air or IR radiation.

In step (b), a molding (FK*) is produced from the thermoplastic polyurethane obtained in step (a). This molding (FK*) may also be a foam or a film, for example, for the purposes of the present invention. For the purposes of the present invention, the molding (FK*) may be produced by any customary mode, as for example by extrusion, injection molding or sintering methods. In accordance with the invention it is also possible for the process for producing the molding to comprise further steps, examples being suitable steps for producing a foam.

In step (c) of the process of the invention, the molding (FK*) is heated to a temperature below the temperature at which the molding (FK*) is permanently deformable, in other words, for example, to a temperature below the melting point, and above the switching temperature of the thermoplastic polyurethane.

According to a further embodiment, then, the present invention relates to a process as described above wherein the beginning of permanent deformability corresponds to the beginning of the melting of the hard phase of the thermoplastic polyurethane, and the switching temperature corresponds to the beginning of the phase transition highest in terms of temperature before the melting range.

Suitable thermoplastic polyurethanes have, for example, a melting temperature in the range from 130 to 250° C., preferably in the range from 160 to 220° C.

Suitable thermoplastic polyurethanes have, for example, a switching temperature in the range from 0 to 120° C., preferably in the range from 20 to 100° C., more preferably in the range from 30 to 80° C.

According to one further embodiment, the present invention, then, relates to a process as described above wherein the switching temperature of the thermoplastic polyurethane ($T_{switch}$) is in the range from 0 to 120° C.

Heating may take place in accordance with the invention in any suitable way known to the skilled person. Heating is accomplished preferably by electrical heating, heating via heated oil or water, induction fields, hot air, IR radiation or high-energy radiation (laser).

The molding (FK*), heated in step (c) of the process of the invention, is then compressed in step (d) of the process. In accordance with the invention, the molding may be compressed in one, two or three dimensions. Following compression, the extent of the molding in at least one dimension is smaller than prior to compressing. Here, the extent of the molding (FK) obtained in step (d) is preferably not more than 75% of the extent of the molding (FK*) in at least one dimension, more preferably not more than 50% of the extent of the molding (FK*). The molding is preferably compressed in at least one dimension and there is no expansion in any other dimension.

According to a further embodiment, then, the present invention relates to a process as described above wherein the extent of the molding (FK) obtained in step (d) in at least one dimension is not more than 75% of the extent of the molding (FK*).

Then, in step (e), the compressed molding (FK) is cooled to a temperature below the switching temperature of the thermoplastic polyurethane. Here, in accordance with the invention, the extent of the molding (FK) remains substantially constant. After cooling and relaxation in step (e), in accordance with the invention, there is a direct, slight expansion of less than 15%, or no extension in the case of substantially open-cell or high-density FK; in the case of closed-cell, low-density FK (<200 g/l), the extension may grow to up to 50%.

It has been found that a molding (FK) obtained by a process of the invention exhibits a shape memory effect. In accordance with the invention this is achieved through the specific process regime in combination with the inventively employed thermoplastic polyurethane.

Hence, in accordance with the invention, the extent of the resultant molding (FK) on cooling to temperatures below the switching temperature may remain substantially constant, and on subsequent heating above the glass transition undergoes expansion by at least 20%—that is, the molding expands. On heating to a temperature above the switching temperature, the expansion relaxes to no more than the original expansion.

For the purposes of the present invention it is essential that the thermoplastic polyurethane is prepared in step (a) using at least one chain extender and the polyol composition as described above. This polyol composition, besides the at least one bisphenol derivative, may comprise further polyols. Accordingly, for the purposes of the present invention, it is also possible to use at least one chain extender and a polyol composition comprising at least one bisphenol A derivative as described above and at least one further polyol.

It is possible in accordance with the invention to use one chain extender; however, mixtures of different chain extenders can also be used.

Chain extenders which can be used for the purposes of the present invention are, for example, compounds having hydroxyl or amino groups, more particularly having 2 hydroxyl or amino groups. In accordance with the invention it is, however, also possible to use mixtures of different compounds as chain extenders. In that case, in accordance with the invention, the average functionality of the mixture is 2.

Chain extenders used with preference in accordance with the invention are compounds having hydroxyl groups, more particularly diols. In that case it is possible to use, preferably, aliphatic, araliphatic, aromatic and/or cycloaliphatic diols having a molecular weight of 50 g/mol to 220 g/mol. Preferred are alkanediols having 2 to 10 carbon atoms in the alkylene radical, more particularly di-, tri-, tetra-, penta-, hexa-, hepta-, octa-, nona- and/or decaalkylene glycols. Particularly preferred for the present invention are 1,2-ethylene glycol, 1,3-propanediol, 1,4-butanediol, 1,6-hexanediol. Aromatic compounds such as hydroxyquinone bis(2-hydroxyethyl) ether may be used as well.

In accordance with the invention it is also possible to use compounds having amino groups, examples being diamines. Mixtures of diols and diamines may likewise be employed.

The chain extender is preferably a diol having a molecular weight Mw<220 g/mol. In accordance with the invention it is possible to use only one diol having a molecular weight Mw<220 g/mol for preparing the transparent thermoplastic polyurethane.

According to a further embodiment, more than one diol is used as chain extender. It is therefore also possible to use mixtures of chain extenders, with at least one diol having a molecular weight Mw<220 g/mol. Where more than one chain extender is used, the second or further chain extender may also have a molecular weight ≥220 g/mol.

According to a further embodiment, the chain extender is selected from the group consisting of 1,4-butanediol and 1,6-hexanediol.

According to a further embodiment, then, the present invention relates to a process as described above wherein the chain extender used in (i) in step (a) of the process of the invention is a diol having a molecular weight Mw<220 g/mol.

The chain extender, more particularly the diol having a molecular weight Mw<220 g/mol, is used preferably in a molar ratio in the range from 40:1 to 1:10 with respect to the bisphenol derivative. The chain extender and the bisphenol derivative are more preferably used in a molar ratio in the range from 20:1 to 1:9, more preferably still in the range from 10:1 to 1:8.5, as for example in the range from 5:1 to 1:5, or else in the range from 4:1 to 1:1, more preferably in the range from 3:1 to 2:1.

According to a further embodiment, then, the present invention relates to a process as described above wherein the chain extender used in (i) and the bisphenol derivative present in the polyol composition are used in a molar ratio of 40:1 to 1:10.

In accordance with the invention, the polyol composition comprises at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated. In accordance with the invention it is also possible for the polyol composition to comprise two or more bisphenol derivatives selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated.

According to one preferred embodiment of the present invention, the at least one bisphenol derivative contains only primary OH groups. According to this embodiment, then, the at least one bisphenol derivative has no phenolic or aromatic OH groups.

In accordance with the invention, at least one of the OH groups of the bisphenol derivative is alkoxylated. In a preferred embodiment of the present invention, both OH groups of the bisphenol derivative are alkoxylated. It has emerged, surprisingly, that through the inventive combination of polyols, or the use of bisphenol derivatives in which at least one of the OH groups is alkoxylated, and preferably both OH groups are alkoxylated, and in which, preferably, there are therefore no aromatic OH groups present, the shape memory properties according to the invention are obtained in the resultant thermoplastic polyurethane.

According to a further embodiment of the present invention, both OH groups of the bisphenol derivative are alkoxylated. Alkoxylated according to the present invention means that an alkoxy group (—O—R— with R=alkylene radical) is incorporated into the chemical bond between the aromatic ring of the bisphenol derivative and the hydroxyl group (—OH). In one embodiment, the two OH groups on the bisphenol derivative are alkoxylated with the same alkoxy group. In that case it is possible, for example, for the OH groups to be alkoxylated with ethoxy (—O—$C_2H_4$—), propoxy (—O—$C_3H_6$—), butoxy (—O—$C_4H_8$—), pentoxy (—O—$C_5H_{10}$—) or hexoxy groups (—O—$C_6H_{12}$—).

According to a further embodiment of the present invention, both OH groups of the bisphenol derivative are alkoxylated with different alkoxy groups (—O—R— with R=alkylene radical). According to one preferred embodiment, the two OH groups of the bisphenol derivative are alkoxylated with two different radicals selected from the group consisting of ethoxy (—O—$C_2H_4$—), propoxy (—O—$C_3H_6$—), butoxy (—O—$C_4H_8$—), pentoxy (—O—$C_5H_{10}$—) or hexoxy radical (—O—$C_6H_{12}$—).

In accordance with the invention, the alkoxy radical may feature one or else two or more alkoxy groups. In one preferred embodiment of the present invention, a bisphenol derivative is used wherein at least one of the OH groups of the bisphenol derivative is alkoxylated, and the at least one alkoxy radical has a molecular weight of >40 g/mol, preferably >60 g/mol, more preferably >120 g/mol, more particularly >180 g/mol, as for example >250 g/mol or else >300 g/mol.

In one further-preferred embodiment of the present invention, a bisphenol derivative is used in which both OH groups of the bisphenol derivative are alkoxylated, and the two alkoxy radicals may be identical or different, and independently of one another have a molecular weight of >40 g/mol, preferably >60 g/mol, more preferably >120 g/mol, more particularly >180 g/mol, as for example >250 g/mol or else >300 g/mol.

In accordance with the invention, the bisphenol derivative is selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated. Further preferred are bisphenol A derivatives or bisphenol S derivatives having a molecular weight Mw>400 g/mol, more preferably a molecular weight Mw>450 g/mol, more particularly a molecular weight Mw>500 g/mol, with particular preference a molecular weight Mw>550 g/mol, as for example a molecular weight Mw>600 g/mol.

In one embodiment, the present invention relates to a thermoplastic polyurethane as described above wherein the at least one bisphenol derivative contains only primary OH groups.

Suitable in accordance with the invention for example is a bisphenol derivative which has the following general formula (I):

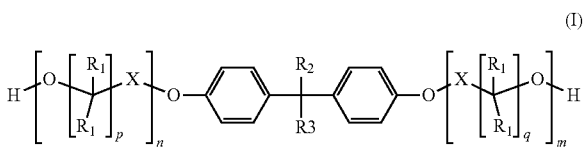

where
R1 independently at each occurrence is a methyl group or H,
R2 and R3 are a methyl group, or
R2-C—R3 together are O=S=O,
X is a group —C(R1)$_2$-, —C(R1)$_2$-C(R1)$_2$- or —C(R1)$_2$-C(R1)$_2$-C(R1)$_2$-,
p and q independently of one another are an integer from 1 to 4, and
n and m independently of one another are an integer >0.

The bisphenol derivative may therefore have the formula (Ia), in which R2 and R3 are a methyl group, or (Ib), in which R2-C—R3 together are O=S=O:

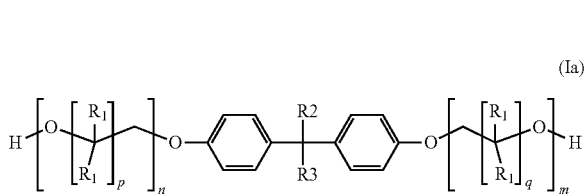

(Ia)

where

R1 independently at each occurrence is a methyl group or H,

R2 and R3 are a methyl group,

X is a group —C(R1)$_2$-, —C(R1)$_2$-C(R1)$_2$- or —C(R1)$_2$-C(R1)$_2$-C(R1)$_2$-, p and q independently of one another are an integer from 1 to 4, and n and m independently of one another are an integer >0;

or

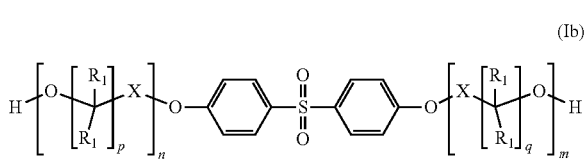

(Ib)

where

R1 independently at each occurrence is a methyl group or H,

R2-C—R3 together are O=S=O,

X is a group —C(R1)$_2$-, —C(R1)$_2$-C(R1)$_2$- or —C(R1)$_2$-C(R1)$_2$-C(R1)$_2$-, p and q independently of one another are an integer from 1 to 4, and n and m independently of one another are an integer >0.

According to one preferred embodiment, the alkoxy radical is in each case an ethoxy radical; in other words, according to one preferred embodiment, the at least one bisphenol derivative has the general formula (II):

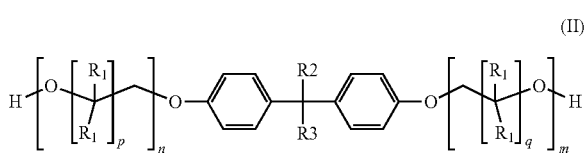

(II)

where

R1 independently at each occurrence is a methyl group or H,

R2 and R3 are a methyl group, or

R2-C—R3 together are O=S=O, p and q independently of one another are an integer from 1 to 4, and n and m independently of one another are an integer >0.

According to a further embodiment, accordingly, the present invention relates to a process as described above wherein the at least one bisphenol derivative has the following general formula (I):

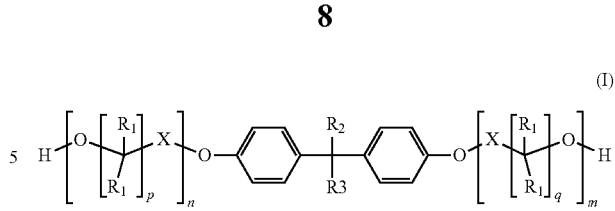

(I)

where

R1 independently at each occurrence is a methyl group or H,

R2 and R3 are a methyl group, or

R2-C—R3 together are O=S=O,

X is a group —C(R1)$_2$-, —C(R1)$_2$-C(R1)$_2$- or —C(R1)$_2$-C(R1)$_2$-C(R1)$_2$-, p and q independently of one another are an integer from 1 to 4, and n and m independently of one another are an integer >0.

According to a further embodiment, the present invention also relates to a process as described above wherein the at least one bisphenol derivative contains only primary OH groups.

According to one preferred embodiment, R1 is hydrogen, i.e. the compound of the formula (I) or (Ia), (Ib) or (II) preferably has primary alcohol groups terminally.

In accordance with the invention, besides the at least one bisphenol derivative, the polyol composition may comprise further polyols. According to one further embodiment, therefore, the present invention relates to a process as described above wherein the polyol composition comprises a polyol selected from the group consisting of polyetherols, polyesterols, polycarbonate alcohols and hybrid polyols.

Polyols are known in principle to the skilled person and described for example in "Kunststoffhandbuch, volume 7, Polyurethane", Carl Hanser Verlag, 3rd edition 1993, section 3.1. Particularly preferred for use as polyols are polyesterols or polyetherols. Polycarbonates may also be employed. Copolymers as well may be used in the context of the present invention. The number-average molecular weight of the polyols used in accordance with the invention is preferably between $0.5 \times 10^3$ g/mol and $8 \times 10^3$ g/mol, more preferably between $0.6 \times 10^3$ g/mol and $5 \times 10^3$ g/mol, more particularly between $0.8 \times 10^3$ g/mol and $3 \times 10^3$ g/mol.

Preferred polyetherols in accordance with the invention are polyethylene glycols, polypropylene glycols and polytetrahydrofurans.

According to one particularly preferred embodiment, the polyol is a polytetrahydrofuran having a molecular weight in the Mn range from 600 g/mol to 2500 g/mol.

Also suitable in accordance with the invention in addition to PTHF are various further polyethers, and also polyesters, block copolymers and hybrid polyols such as, for example, poly(ester/amide) can be used.

The polyols used preferably have an average functionality of between 1.8 and 2.3, preferably between 1.9 and 2.2, more particularly 2. Preferably the polyols used in accordance with the invention contain only primary hydroxyl groups.

In accordance with the invention the polyol may be used in pure form or in the form of a composition comprising the polyol and at least one solvent. Suitable solvents are known per se to the skilled person.

The additional polyol is preferably used in a molar ratio in the range from 40:1 to 1:10 with respect to the bisphenol derivative. In further-preferred embodiments, the polyol and the bisphenol derivative are used in a molar ratio in the range from 30:1 to 1:9, more preferably in the range from 20:1 to 1:8.5, more particularly in the range from 15:1 to 1:5, very preferably in the range from 10:1 to 1:2, or else in the range from 7:1 to 1:1.6.

In accordance with the invention at least one polyisocyanate is used. In accordance with the invention it is also possible to use mixtures of two or more polyisocyanates.

Preferred polyisocyanates in the context of the present invention are diisocyanates, especially aliphatic or aromatic diisocyanates, more preferably aromatic diisocyanates.

According to one further embodiment, therefore, the present invention relates to a process as described above wherein the polyisocyanate is an aromatic diisocyanate.

It is possible furthermore for the purposes of the present invention to use prereacted prepolymers as isocyanate components, in which some of the OH components are reacted with an isocyanate in a prior reaction step. In a subsequent step, the polymer reaction proper, these prepolymers are reacted with the remaining OH components and then form the thermoplastic polyurethane. The use of prepolymers affords the possibility of using OH components with secondary alcohol groups as well.

Aliphatic diisocyanates used are customary aliphatic and/or cycloaliphatic diisocyanates, examples being tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methyl-2,4- and/or 1-methyl-2,6-cyclohexane diisocyanate, 4,4'-, 2,4'- and/or 2,2'-methylenedicyclohexyl diisocyanate (H12MDI).

Preferred aliphatic polyisocyanates are hexamethylene 1,6-diisocyanate (HDI), 1-isocyanato-3,3,5-trimethyl-5-isocyanatomethylcyclohexane and 4,4'-, 2,4'- and/or 2,2'-methylenedicyclohexyl diisocyanate (H12MDI); especially preferred are 4,4'-, 2,4'- and/or 2,2'-methylenedicyclohexyl diisocyanate (H12MDI) and 1-isocyanato-3,3,5-trimethyl-5-isocyanatomethylcyclohexane or mixtures thereof.

The present invention, according to a further embodiment, accordingly relates to a process as described above wherein the polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethylcyclohexane (IPDI) or mixtures thereof.

Suitable aromatic diisocyanates are, in particular, 2,2'-, 2,4'- and/or 4,4'-diphenylmethane diisocyanate (MDI), 1,5-naphthylene diisocyanate (NDI), 2,4- and/or 2,6-toluylene diisocyanate (TDI), 3,3'-dimethyl-4,4'-diisocyanatobiphenyl (TODI), p-phenylene diisocyanate (PDI), diphenylethane 4,4'-diisocyanate (EDI), diphenylmethane diisocyanate, 3,3'-dimethyldiphenyl diisocyanate, 1,2-diphenylethane diisocyanate and/or phenylene diisocyanate.

According to a further embodiment, the present invention relates to a process as described above wherein the polyisocyanate is an aliphatic diisocyanate.

In accordance with the invention, the polyisocyanate may be used in pure form or in the form of a composition comprising the polyisocyanate and at least one solvent. Suitable solvents are known to the skilled person. Suitable examples include nonreactive solvents such as ethyl acetate, methyl ethyl ketone and hydrocarbons.

In accordance with the invention it is possible, in the reaction of the at least one aliphatic polyisocyanate, the at least one chain extender, and the at least one polyol composition, to add further substances, examples being catalysts or auxiliaries and adjuvants.

Suitable auxiliaries and adjuvants are known per se to the skilled person. Examples include surface-active substances, flame retardants, nucleating agents, oxidation stabilizers, antioxidants, slip aids and demolding aids, dyes and pigments, stabilizers, for example, with respect to hydrolysis, light, heat or discoloration, organic and/or inorganic fillers, reinforcing agents, and plasticizers. Suitable auxiliaries and adjuvants may be found, for example, in Kunststoffhandbuch, volume VII, edited by Vieweg and Hochtlen, Carl Hanser Verlag, Munich 1966 (pp. 103-113).

In accordance with the invention it is possible, furthermore, to use catalysts. Suitable catalysts are likewise known in principle from the prior art. Examples of suitable catalysts are organic metal compounds selected from the group consisting of tin, titanium, zirconium, hafnium, bismuth, zinc, aluminum and iron organyls, such as, for example, tin organyl compounds, preferably tin dialkyls such as tin(II) isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanic esters, bismuth compounds, such as bismuth alkyl compounds, preferably bismuth neodecanoate or the like, or iron compounds, preferably iron(VI) acetylacetonate.

According to one preferred embodiment, the catalysts are selected from tin compounds and bismuth compounds, more preferably tin alkyl compounds or bismuth alkyl compounds. Particularly suitable are tin(II) isooctoate and bismuth neodecanoate.

The catalysts are used customarily in amounts of 3 ppm to 2000 ppm, preferably 10 ppm to 1000 ppm, more preferably 20 ppm to 500 ppm, and most preferably from 30 ppm to 300 ppm.

In accordance with the invention, preference is given to using at least one blowing agent. Within the context of the present invention it is possible here to use chemical or physical blowing agents or mixtures thereof.

Chemical blowing agents used here are substances which decompose thermally during production of the foam and, in so doing, give off gases; examples are hydrogencitrates, hydrogencarbonates or azodicarbonamides, such as Celogoene®, Tracel®, and Hydrocerol®.

Physical blowing agents used here are substances, preferably inert liquids, which evaporate during production of the foam. Suitable examples include butane and pentane. Particularly preferred for use as blowing agent is a combination of sodium hydrogencitrate and sodium hydrogencarbonate. The chemical or physical blowing agents are used preferably in thermoplastic vehicles, such as EVA (ethylene-vinyl acetate), for example.

In accordance with the invention it is likewise possible to use encapsulated physical blowing agents, such as, for example, polystyrene or styrene-acrylonitrile polymers (SAN) laden with blowing agent. Preference is given, for example, to using hollow polymeric bodies filled with blowing agent.

Suitable hollow polymeric bodies filled with blowing agent are based preferably on a polymer whose polarity is lower than that of the thermoplastic polyurethane used. They are preferably based on polystyrene or styrene-acrylonitrile polymers (SAN). Employed for example as hollow polymeric bodies filled with blowing agent are what are called expandable microspheres. Expandable microspheres are hollow microbeads which consist of a thin polymeric shell made preferably of polyacrylonitrile or copolymers thereof. These hollow microbeads are filled with gas or with low-boiling liquids, preferably with hydrocarbons. Because of the temperature to which they are exposed in the thermoplastic processing, the polymeric shell of the microbeads softens and at the same time the enclosed gas expands. This causes expansion of the microspheres. The expandability of the microspheres can be described by determination of the TMA density [kg/m$^3$] (Stare Thermal Analysis System from Mettler Toledo; heating rate 20° C./min). The TMA density here is the minimum attainable density at a particular temperature $T_{max}$ under atmospheric pressure before microspheres collapse.

The hollow polymeric bodies filled with blowing agent preferably have a diameter of between 20 μm and 40 μm. Examples of hollow polymeric bodies of this kind, filled with blowing agent, are available from Akzo Nobel, Casco Products GmbH, Essen, Germany, under the brand name Expancel®.

As a result of using hollow polymeric bodies filled with blowing agent and having a TMA density of less than 10 kg/m$^3$, preferably of 2-10 kg/m$^3$ and especially preferably of 2-7 kg/m$^3$, in powder form or masterbatch form, a particularly fine cell structure, the suppression of voiding, and an absence of sink marks are observed, and, moreover, the processing range, in terms of temperature, for example, is much greater, and so microspheres with a TMA density of this kind are particularly preferred. Suitable hollow polymeric bodies filled with blowing agent have, for example, a bimodal particle size distribution. The particle sizes in this case are selected so as to maximize space filling of the expanded particles and so to obtain a minimum density in the resulting foam.

The amount of hollow polymeric bodies filled with blowing agent that is used in the mixture is dependent on the target density of the expanded thermoplastic polyurethane. Preference is given to using between 1 part and 20 parts by weight, preferably between 2 parts and 10 parts by weight, of the hollow polymeric bodies filled with blowing agent per 100 parts by weight of the thermoplastic polyurethane to be expanded, in other words to be foamed.

For producing the foams, the thermoplastic polyurethane and the hollow polymeric bodies filled with blowing agent, and also, where appropriate, the additional blowing agent, are mixed and processed to give the desired moldings. This may be done, for example, by injection molding, by sintering or by extrusion. As a result of the temperature during thermoplastic processing, the expandable microspheres undergo expansion and therefore the expanded TPU is formed. The melt is preferably brought continuously into the desired shape and solidified or recrystallized.

In accordance with the invention it is also possible for the polyurethane to take the form of bead foam. Foams in the form of expanded foam beads may be obtained, for example, by the suspension process or the autoclave process, in other words by impregnation of pellets with a blowing agent in aqueous suspension in a pressure vessel, with subsequent depressurization, as described for example in EP 1979401 A1.

The bulk density of the expanded beads obtainable in this way is preferably 10 to 300 kg/m'. The compact thermoplastic polyurethane starting material used may be employed in the form of pellets, powder, nodules or some other form. It is useful to use cylindrical or globular pellets. The spherical pellets have a preferred average diameter of 0.2 to 10 mm, more particularly of 0.5 to 5 mm. In the case of cylindrical pellets, the length is preferably 0.2 to 10 mm, more particularly 0.5 to 5 mm. The pellets may also have a platelet shape.

In the case of the suspension process, it is common to operate batchwise in an impregnating vessel, such as in a stirred tank reactor. Metered into the reactor is the TPU, in the form of pellets, for example, along with water or a different suspension medium, and also with the blowing agent and, where appropriate, a suspension assistant. Suitable suspension assistants are water-insoluble inorganic stabilizers, such as tricalcium phosphate, magnesium pyrophosphate, and metal carbonates; and also polyvinyl alcohol and surfactants, such as sodium dodecylarylsulfonate. They are used customarily in amounts of 0.05 to 10 wt %, based on the TPU. The reactor is then closed and the reactor contents are heated to an impregnating temperature of customarily at least 100° C. The blowing agent in this case may be added before, during or after the heating of the reactor contents. The impregnating temperature ought to be situated in the range of the softening temperature of the TPU. Preferred impregnating temperatures are from 100 to 150, more particularly 110 to 145° C.

Depending on the nature and quantity of the blowing agent and also on the level of the temperature, a pressure (impregnating pressure) is established in the closed reactor which is generally 2 to 100 bar (absolute). Where necessary, the pressure may be regulated by a pressure-regulating valve or further injection of blowing agent. Under the impregnating conditions, i.e. elevated temperature and superatmospheric pressure, blowing agent diffuses into the particulate polymer pellets. The impregnating time is generally 0.5 to 10 hours. This is followed by sudden hot depressurization. On depressurization, the blowing agent diffused beforehand into the TPU particles undergoes "explosive" expansion, causing the softened particles to foam up.

The suspension is customarily depressurized through a nozzle, a valve or another suitable apparatus. The suspension may be depressurized directly to atmospheric pressure, 1013 mbar for example. Preferably, however, depressurization takes place into an intermediate vessel, with a pressure sufficient for foaming of the TPU particles but possibly above atmospheric pressure. Depressurization takes place appropriately to a pressure, for example, of 0.5 to 5 bar, more particularly 1 to 3 bar (absolute). During depressurization, the impregnating pressure in the impregnating vessel may be kept constant by further injection of blowing agent or inert gas (e.g. nitrogen).

This produces expanded TPU particles which eventually are removed from the suspension in a customary way. Adhering water is removed generally by drying, in a flow dryer, for example. If necessary, adhering suspension assistant can be removed by treating the particles with a suitable reagent, such as with an acid like nitric acid, hydrochloric acid or sulfuric acid, in order to remove acid-soluble suspension assistants, e.g. metal carbonates or tricalcium phosphate.

For the purposes of the present invention it is also possible to use mixtures of different blowing agents, more particularly mixtures comprising at least one encapsulated blowing agent and at least one chemical blowing agent, or mixtures comprising at least one encapsulated blowing agent and at least one physical blowing agent.

The process according to step (a) may in principle be carried out under reaction conditions which are known per se.

In accordance with the invention, the thermoplastic polyurethanes obtained by means of the process of the invention are processed to form a molding (FK*). The process of the invention accordingly encompasses step (a) and steps (b) to (e). In accordance with the invention the process may comprise further steps, examples being temperature treatments. Preferably, however, the process of the invention consists exactly of steps (a) to (e) without further steps in between.

According to one further embodiment, the present invention relates to a process as described above wherein the molding (FK) undergoes restoration as a result of heating to a temperature above the switching temperature.

The process of the invention produces a molding (FK) which exhibits a shape memory effect. According to one further aspect, the present invention also relates to moldings obtainable or obtained by a process as described above.

The molding (FK) may in principle be a structure of any possible form—examples are plates, hoses, films, sealing tapes, profiles or blanks of foams in general, as for example bead foams or extruded foams.

According to one further embodiment, therefore, the present invention relates to a molding as described above wherein the molding is a foam.

The molding of the invention is preferably a porous molding, preferably having a density in the range from 20 g/l to 1000 g/l, more preferably in the range from 50 g/l to 500 g/l.

The moldings obtained and obtainable in accordance with the invention are suitable, for example, as expandable seals. In this case the unexpanded molding is inserted or bonded into a cavity and is expanded by supply of heat. The present invention therefore also relates to the use of a molding of the invention as a seal in the construction industry, in apparatus construction and vehicle construction and in the electrical industry.

The moldings obtained or obtainable in accordance with the invention are additionally suitable as active switching elements, too. In this case, on attainment of the switching temperature, the expansion of the molding triggers, for example, a mechanical and/or electrical signal chain.

The present invention accordingly also relates to the use of a molding of the invention as an active switching element.

The present invention further also relates to the use of a thermoplastic polyurethane for producing a molding of the invention. According to one further embodiment, therefore, the present invention relates to the use of a thermoplastic polyurethane for producing a molding which exhibits a shape memory effect in a temperature range from 0° C. to 120° C. and is able to expand in at least one dimension, the thermoplastic polyurethane being obtainable or obtained by reaction of at least components (i) to (iii):
(i) a polyisocyanate composition;
(ii) at least one chain extender; and
(iii) at least one polyol composition,
the polyol composition comprising at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated.

Further embodiments of the present invention are apparent from the claims and the examples. It is understood that the features identified above and elucidated below of the article/process/uses according to the invention can be used not only in the particular combination indicated but also in other combinations as well without departing the scope of the invention. For example, the combination of a preferred feature with a more preferred feature, or of an otherwise uncharacterized feature with a more preferred feature, etc., is also implicitly encompassed, even if that combination is not expressly mentioned.

Listed below are exemplary embodiments of the present invention that do not restrict the present invention. In particular, the present invention also encompasses those embodiments which arise from the dependency references indicated below and combinations therewith.

1. A process for producing a molding (FK), comprising the following steps:
    (a) preparing a thermoplastic polyurethane, comprising the reaction of
        (i) at least one polyisocyanate composition;
        (ii) at least one chain extender; and
        (iii) at least one polyol composition,
        the polyol composition comprising at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated;
    (b) producing a molding (FK*) from the thermoplastic polyurethane,
    (c) heating the molding (FK*) to a temperature below the temperature at which the molding (FK*) is permanently deformable, and above the switching temperature of the thermoplastic polyurethane,
    (d) compressing the heated molding (FK*) to give a molding (FK),
    (e) cooling the molding (FK) to a temperature below the switching temperature of the thermoplastic polyurethane.
2. The process according to embodiment 1, wherein the thermoplastic polyurethane is a bead foam or an extruded foam.
3. The process according to either of embodiments 1 and 2, wherein the beginning of permanent deformability corresponds to the beginning of the melting of the hard phase of the thermoplastic polyurethane, and the switching temperature corresponds to the beginning of the phase transition highest in terms of temperature before the melting range.
4. The process according to any of embodiments 1 to 3, wherein the switching temperature of the thermoplastic polyurethane ($T_{switch}$) is in the range from 0 to 120° C.
5. The process according to any of embodiments 1 to 4, wherein the extent of the molding (FK) obtained in step (d) in at least one dimension is not more than 75% of the extent of the molding (FK*).
6. The process according to any of embodiments 1 to 5, wherein the chain extender used in (i) is a diol having a molecular weight Mw<220 g/mol.
7. The process according to any of embodiments 1 to 6, wherein the chain extender used in (i) and the bisphenol derivative present in the polyol composition are used in a molar ratio of 40:1 to 1:10.
8. The process according to any of embodiments 1 to 7, wherein the at least one bisphenol derivative has the following general formula (I):

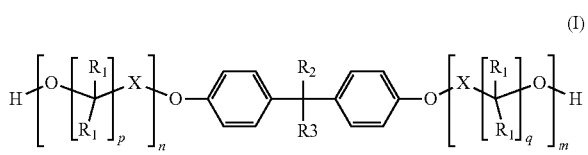

where
R1 independently at each occurrence is a methyl group or H,
R2 and R3 are a methyl group, or
R2—C—R3 together are O=S=O,
X is a group —C(R1)$_2$-, —C(R1)$_2$-C(R1)$_2$- or —C(R1)$_2$-C(R1)$_2$-C(R1)$_2$-,
p and q independently of one another are an integer from 1 to 4, and
n and m independently of one another are an integer >0.
9. The process according to any of embodiments 1 to 8, wherein the at least one bisphenol derivative contains only primary OH groups.
10. The process according to any of embodiments 1 to 9, wherein the polyol composition comprises a polyol selected from the group consisting of polyetherols, polyesterols, polycarbonate alcohols and hybrid polyols.
11. The process according to any of embodiments 1 to 10, wherein the polyisocyanate is an aromatic diisocyanate.
12. The process according to any of embodiments 1 to 10, wherein the polyisocyanate is an aliphatic diisocyanate.
13. The process according to any of embodiments 1 to 12, wherein the molding (FK) undergoes restoration by heating to a temperature above the switching temperature.
14. A molding obtainable or obtained by a process according to any of embodiments 1 to 13.
15. The molding according to embodiment 14, wherein the molding is a foam.
16. The use of a molding according to embodiment 14 or 15 as a seal in the construction industry, in apparatus construction and vehicle construction, and in the electrical industry.
17. The use of a molding according to embodiment 14 or 15 as an active switching element.
18. The use of a thermoplastic polyurethane for producing a molding which exhibits a shape memory effect in a temperature range from 0° C. to 120° C. and is able to expand in at least one dimension, the thermoplastic polyurethane being obtainable or obtained by reaction of at least components (i) to (iii):
(i) a polyisocyanate composition;
(ii) at least one chain extender; and
(iii) at least one polyol composition,
the polyol composition comprising at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated.

The examples hereinafter serve to illustrate the invention, but are in no way restrictive of the subject matter of the present invention.

EXAMPLES

Ingredients Used were as Follows:
Polyol 1: polyether polyol with an OH number of 113.3 and exclusively primary OH groups (based on tetramethylene oxide, functionality: 2)
Polyol 2: bisphenol A-started polyether polyol with an OH number of 313 and exclusively primary OH groups, functionality: 2
Polyol 3: polyester polyol based on adipic acid MEG with MW 470 g/mol and an OH number of 240, functionality: 2
Isocyanate 1: aliphatic isocyanate (4,4'-methylenedicyclohexyl diisocyanate)
Isocyanate 2: aromatic isocyanate (4,4'-methylenediphenyl diisocyanate)
CE: 1,4-butanediol
Catalyst 1: tin(II) isooctoate (50% in dioctyl adipate)
Stabilizer 1: sterically hindered phenol
Additive 1: ester wax 1. General Preparation Example The polyols were charged to a vessel at 80° C. and mixed with the components as per Tables 1 and 2 with vigorous stirring. The reaction mixture underwent heating to more than 110° C., at which point it was poured out onto a heated, Teflon-coated bench. The cast slab obtained was heat-treated at 80° C. for 15 hours, then pelletized. The resulting extruded pellets had a particle weight of 34-37 mg.

TABLE 1

| Number | Comparative 1 | Example 1 | Example 2 | Example 3 | Example 4 | Example 5 | Example 6 |
|---|---|---|---|---|---|---|---|
| Polyol 1 [g] | 700 | 490 | 280 | 970 | 900 | 800 | 700 |
| Polyol 2 [g] | 0 | 210 | 420 | 30 | 100 | 200 | 300 |
| Polyol 3 [g] | 0 | 0 | 0 | 0 | 0 | 0 | 0 |
| Isocyanate 1 [g] | 588.00 | 675.3 | 763.39 | | | | |
| Isocyanate 2 [g] | | | | 510.18 | 533.93 | 567.85 | 601.78 |
| CE [g] | 183.33 | 147.72 | 151.91 | 90.56 | 91.99 | 94.02 | 96.06 |
| Catalyst 1 | 571 µL | 609 µL | 646 µL | | | | |
| Stabilizer 1 [g] | 7.18 | 7.67 | | 16.16 | 16.42 | 16.78 | 17.14 |
| Additive 1 [g] | 2.87 | 3.07 | | | | | |
| Index | 1000 | 1000 | 1020 | 1000 | 1000 | 1000 | 1000 |
| Hard segment content | 37.90% | 37.90% | 36.78% | 21.37% | 21.37% | 21.37% | 21.37% |
| Initiation temperature | 80° C. | 80° C. | 80° C. | 80° C. | 80° C. | 80° C. | 80° C. |
| Casting temperature | 110° C. | 110° C. | 110° C. | 110° C. | 110° C. | 110° C. | 110° C. |
| Time 80°-110° C. | 3 min | 3 min 30 sec | 7 min | 1 min 05 sec | 1 min 00 sec | 51 sec | 44 sec |

TABLE 2

| Number | Comparative 2 | Example 7 | Comparative 3 |
|---|---|---|---|
| Polyol 1 [g] | 800 | 320 | 623.08 |
| Polyol 2 [g] | 0 | 480 | 0 |
| Polyol 3 [g] | 0 | 0 | 127 |
| Isocyanate 1 [g] | | | |
| Isocyanate 2 [g] | 400 | 561.31 | 690 |
| CE [g] | 71.32 | 80.91 | 157.40 |
| Catalyst 1 | 571 μL | 609 μL | 646 μL |
| Stabilizer 1 [g] | 12.84 | 14.57 | 16.14 |
| Additive 1 [g] | | | |
| Index | 1000 | 1000 | 1000 |
| Hard segment content | 21.20% | 21.20% | 37.87% |
| Initiation temperature | 80° C. | 80° C. | 80° C. |
| Casting temperature | 110° C. | 110° C. | 110° C. |
| Time 80°-110° C. | 1 min 05 sec | 42 sec | 1 min 21 sec |

Foam elements were produced from the samples by means of bead foam expansion and subsequent steam welding or foam extrusion.

2. Production of Foam Beads by the Suspension Process

The experiments were conducted with a tank fill occupancy of 80%.

100 parts by weight (corresponding to 27.5 wt %, based on the overall suspension without blowing agent) of the pellets, 257 parts by weight (corresponding to 70.6 wt %, based on the overall suspension without blowing agent) of water, 6.7 parts by weight (corresponding to 1.8 wt %, based on the overall suspension without blowing agent) of calcium carbonate, 0.13 part by weight (corresponding to 0.04 wt %, based on the overall suspension without blowing agent) of a surface-active substance, and 24 parts by weight of butane as blowing agent (24%, based on the quantity of pellets used) were heated with stirring. Then, additionally, nitrogen was injected into the liquid phase at 50° C. and the internal pressure was adjusted to 8 bar. Subsequently, when the impregnating temperature (IMT) of 125° C. is reached, depressurization is carried out using a depressurizing apparatus.

The adhering suspension assistants (calcium carbonate and surfactant) are subsequently removed with dilute nitric acid, the foam beads are washed with deionized water, and the washed beads are then dried.

The resulting bulk density (BD) was ascertained thereafter.

TABLE 3

| Sample | Produced by suspension process | Resulting bulk density [g/l] |
|---|---|---|
| Comparative 2 | + | 89 |
| Example 3 | + | 89 |
| Example 4 | + | 84 |
| Example 5 | + | 86 |
| Example 6 | + | 86 |

3. Production of Molded Parts

The foam beads produced as described above were introduced into a preheated mold under pressure and with compaction. This mold was heated reciprocally with steam from 1.0 to 4.0 bar, i.e., at temperatures from 100° C. to 140° C. The pressure in the mold was then removed, the mold was cooled with water and/or air and opened, and the mechanically stable molded part was removed.

4. Production of an Extruded Foam

The formulas specified in Table 5 were processed using the extrusion line described below, with addition of blowing agents Treib1 and Treib2, to give foam sheets approximately 2 mm thick. 8 foam sheet strips were subsequently stacked to a thickness of 1.5 cm and fixed using PU binder. The expansion behavior was determined on these slabs.

Treib1: concentrate of sodium hydrogencitrate (32%) and sodium hydrogencarbonate (24%) in ethylene-vinyl acetate copolymer (EVA)

Treib2: PS/SAN microspheres in EVA

5. Extrusion Procedure

The samples characterized in Table 5 were processed to sheets on a Brabender single-screw extruder with flat sheet die.

Prior to the extrusion, the pellets were mixed with 3 wt % of Treib1 and 9 wt % of Treib2 and extruded in the form of a dry blend.

Extruder: Brabender Plasti-Corder PLE 331
L/D ratio: L=25 D
Screw diameter: D=19 mm
Screw compression ratio: 3:1
Die: flat die
Extrusion type: sheet Further extrusion conditions are evident from the table below:

TABLE 4

| | Temperature profile [° C.] | | | | | ST | |
|---|---|---|---|---|---|---|---|
| No. | Z 1 | 190 | Z 3 | Z 4 | Z 5 | [Nm] | Remarks |
| C1 | 200 | 210 | 210 | 190 | 190 | 5 | homogeneous |
| C2 | 200 | 200 | 200 | 180 | 180 | 10 | homogeneous |
| C3 | 210 | 210 | 210 | 190 | 190 | 6 | inhomogeneous, rough |
| B1 | 210 | 215 | 215 | 200 | 200 | 5 | homogeneously foamed |
| B2 | 210 | 210 | 210 | 185 | 185 | 5 | homogeneous, stiff |
| B6 | 200 | 210 | 210 | 180 | 180 | 8 | homogeneous |
| B7 | 210 | 210 | 210 | 190 | 190 | 4 | homogeneous, stiff |

ST = torque at the screw

TABLE 5

| Sample | Production by the extrusion process | Resulting sample density [g/l] |
|---|---|---|
| Comparative 1 | + | 280 |
| Comparative 2 | + | 220 |
| Comparative 3 | + | 250 |
| Example 1 | + | 280 |
| Example 2 | + | 250 |
| Example 6 | + | 230 |
| Example 7 | + | 290 |

6. Determination of Expansion Behavior

Sample specimens 15 mm thick were heated in a heating cabinet at 50° C. or 70° C. for 2 h and while still hot were compressed to a thickness of 7.5 mm using a pressing apparatus. The specimens were left in the pressing apparatus for 12 hours, and underwent cooling to room temperature. The specimens were then removed from the apparatus, at which point they relaxed to sample thickness 1, at which they could be stably stored for days. To test the resilience, the specimens were immersed into hot water at 90° C. for 1 minute. During this procedure, the samples of the invention expanded again to the thickness 2.

What is claimed is:
1. A process for producing a molding (FK), comprising:
(a) preparing a thermoplastic polyurethane, comprising the reaction of
  (i) at least one polyisocyanate composition;
  (ii) at least one chain extender; and
  (iii) at least one polyol composition,

TABLE 6

Relaxation behavior of the samples after heating at 50° C.

| Sample | Thickness 1 after compression at 50° C. and cooling to RT | Thickness 1 as % of original thickness | Observation in hot water | Expansion to thickness 2 | Expansion from thickness 1 to thickness 2 in % (thickness 1 = 100%) |
|---|---|---|---|---|---|
| Comparative 1 extrusion | 13 mm | 87% | no expansion | | |
| Comparative 2 extrusion | 14 mm | 93% | no expansion | | |
| Comparative 2 suspension | 14 mm | 93% | no expansion | | |
| Comparative 3 extrusion | 12 mm | 80% | no expansion | | |
| Example 1 extrusion | 12 mm | 80% | expansion | 14.5 mm | 121% |
| Example 2 extrusion | 12 mm | 80% | expansion | 15 mm | 125% |
| Example 3 suspension | 13 mm | 87% | slight expansion | 14 mm | 107% |
| Example 4 suspension | 12 mm | 80% | rapid expansion | 15 mm | 125% |
| Example 5 suspension | 11 mm | 73% | rapid expansion | 15 mm | 136% |
| Example 6 suspension | 11 mm | 73% | slow expansion | 14 mm | 127% |
| Example 6 extrusion | 11 mm | 73% | slow expansion | 14 mm | 127% |
| Example 7 extrusion | 10 mm | 66% | slow expansion | 14 mm | 140% |

TABLE 7

Relaxation behavior of the samples after heating at 70° C.

| Sample | Thickness 1 after compression at 50° C. and cooling to RT | Thickness 1 as % of original thickness | Observation in hot water | Expansion to thickness 2 | Expansion from thickness 1 to thickness 2 in % (thickness 1 = 100%) |
|---|---|---|---|---|---|
| Comparative 1 extrusion | 11 mm | 73% | no expansion | | |
| Comparative 2 suspension | 12 mm | 80% | no expansion | | |
| Comparative 2 extrusion | 12 mm | 80% | no expansion | | |
| Comparative 3 extrusion | 10 mm | 66% | no expansion | | |
| Example 1 extrusion | 11 mm | 73% | expansion | 14 mm | 127% |
| Example 2 extrusion | 11 mm | 73% | expansion | 15 mm | 136% |
| Example 3 suspension | 12 mm | 80% | slight expansion | 13.5 mm | 112% |
| Example 4 suspension | 11 mm | 73% | rapid expansion | 15 mm | 136% |
| Example 5 suspension | 11 mm | 73% | rapid expansion | 15 mm | 136% |
| Example 6 suspension | 10 mm | 66% | rapid expansion | 15 mm | 150% |
| Example 6 extrusion | 10 mm | 66% | rapid expansion | 15 mm | 150% |
| Example 7 extrusion | 9 mm | 60% | rapid expansion | 15 mm | 166% | the polyol composition comprising at least one bisphenol derivative selected from the group consisting of bisphenol A derivatives having a molecular weight Mw>315 g/mol and bisphenol S derivatives having a molecular weight Mw>315 g/mol, at least one of the OH groups of the bisphenol derivative being alkoxylated;
(b) producing a molding (FK*) from the thermoplastic polyurethane,
(c) heating the molding (FK*) to a temperature below the temperature at which the molding (FK*) is permanently deformable, and above the switching temperature of the thermoplastic polyurethane,
(d) compressing the heated molding (FK*) to give a molding (FK), and
(e) cooling the molding (FK) to a temperature below the switching temperature of the thermoplastic polyurethane,
wherein the molding is a foam, and
wherein the chain extender (ii) is a diol having a molecular weight Mw<220 g/mol.

2. The process according to claim 1, wherein the thermoplastic polyurethane is a bead foam or an extruded foam.

3. The process according to claim 1, wherein the beginning of permanent deformability corresponds to the beginning of melting of the hard phase of the thermoplastic polyurethane, and the switching temperature corresponds to the beginning of the phase transition highest in terms of temperature before the inciting range.

4. The process according to claim 1, wherein the switching temperature of the thermoplastic polyurethane ($T_{switch}$) is in the range from 0 to 120° C.

5. The process according to claim 1, wherein the extent of the molding (FK) obtained in (d) in at least one dimension is not more than 75% of the extent of the molding (FK*).

6. The process according to claim 1, wherein the chain extender (ii) and the bisphenol derivative present in the polyol composition are used in a molar ratio of 40:1 to 1:10.

7. The process according to claim 1, wherein the at least one bisphenol derivative has the following formula (I):

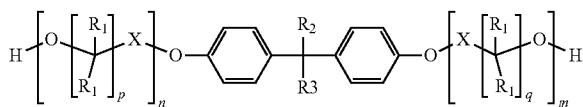

wherein R1 independently at each occurrence is a methyl group or H,
R2 and R3 are a methyl group, or
R2-C—R3 together are O=S=O,
X is a group —C(R1)$_2$-, —C(R1)$_2$-C(R1)$_2$- or —C(R1)$_2$-C(R1)$_2$-C(R1)$_2$-,
p and q independently of one another are an integer from 1 to 4, and
n and m independently of one another are an integer >0.

8. The process according to claim 1, wherein the at least one bisphenol derivative comprises only primary OH groups.

9. The process according to claim 1, wherein the polyol composition comprises a polyol selected from the group consisting of polyetherols, polyesterols, polycarbonate alcohols and hybrid polyols.

10. The process according to claim 1, wherein the polyisocyanate is an aromatic diisocyanate.

11. The process according to claim 1, wherein the polyisocyanate is an aliphatic diisocyanate.

12. The process according to claim 1, wherein the molding (FK) undergoes restoration by heating to a temperature above the switching temperature.

* * * * *

UNITED STATES PATENT AND TRADEMARK OFFICE
CERTIFICATE OF CORRECTION

PATENT NO. : 10,563,004 B2
APPLICATION NO. : 15/561747
DATED : February 18, 2020
INVENTOR(S) : Stefan Bokern et al.

Page 1 of 1

It is certified that error appears in the above-identified patent and that said Letters Patent is hereby corrected as shown below:

On the Title Page

Item (56), Column 2, other publications, Line 8, "3A ," should read -- 3.1., --

In the Specification

In Column 9, Line 52, "(TODD," should read -- (TODI) --

In the Claims

In Column 21, Lines 25-26, Claim 3, "poly urethane" should read -- polyurethane --

In Column 21, Line 28, Claim 3, "inciting" should read -- melting --

Signed and Sealed this
Fourth Day of August, 2020

Andrei Iancu
*Director of the United States Patent and Trademark Office*